United States Patent [19]

Motoe et al.

[11] Patent Number: 5,021,870
[45] Date of Patent: Jun. 4, 1991

[54] INTERPOLATION OF SCAN LINES FROM VIDEO SIGNALS HAVING INTERLACED SCAN LINES

[75] Inventors: Hisafumi Motoe; Hiroyuki Kawashima, both of Tokyo; Masaharu Tokuhara, Kanagawa, all of Japan

[73] Assignee: Sony Corporation, Tokyo, Japan

[21] Appl. No.: 379,943

[22] Filed: Jul. 14, 1989

[30] Foreign Application Priority Data

Jul. 19, 1988 [JP] Japan ................................. 63-179619

[51] Int. Cl.$^5$ ......................... H04N 11/20; H04N 7/01
[52] U.S. Cl. ........................................ 358/11; 358/140
[58] Field of Search .................................. 358/11, 140

[56] References Cited

U.S. PATENT DOCUMENTS

| | | | |
|---|---|---|---|
| 4,322,750 | 3/1982 | Lord et al. | 358/140 |
| 4,626,891 | 12/1986 | Achiha | 358/11 |
| 4,677,483 | 6/1987 | Dischert et al. | 358/11 |
| 4,785,351 | 11/1988 | Ishikawa | 358/140 |

Primary Examiner—Tommy P. Chin
Assistant Examiner—Wendy R. Greening
Attorney, Agent, or Firm—Alvin Sinderbrand; William S. Frommer

[57] ABSTRACT

Interpolated scan lines are produced in response to received video signals which are comprised of conventional interlaced scan lines constituting successive fields. A delay circuit, preferably formed of field memory devices, such as three cascaded field memories, functions to delay the received video signals to provide a first scanned line signal in a given field, the next succeeding scan line signal in that field, an interlaced scan line signal in the next succeeding field and an interlaced scan line signal in the next preceding field. A first combining circuit combines the signal values of the next succeeding field interlaced scan line signal and the next preceding field interlaced scan line signal to form a first combined scan line signal. A second combining circuit combines the signal values of the first scan line signal in the given field and the next succeeding scan line signal in that field to form a second combined scan line signal. The first and second combined scan line signals are level adjusted and added to produce an interpolated scan line signal intermediate successive main scan lines in the given field.

34 Claims, 3 Drawing Sheets

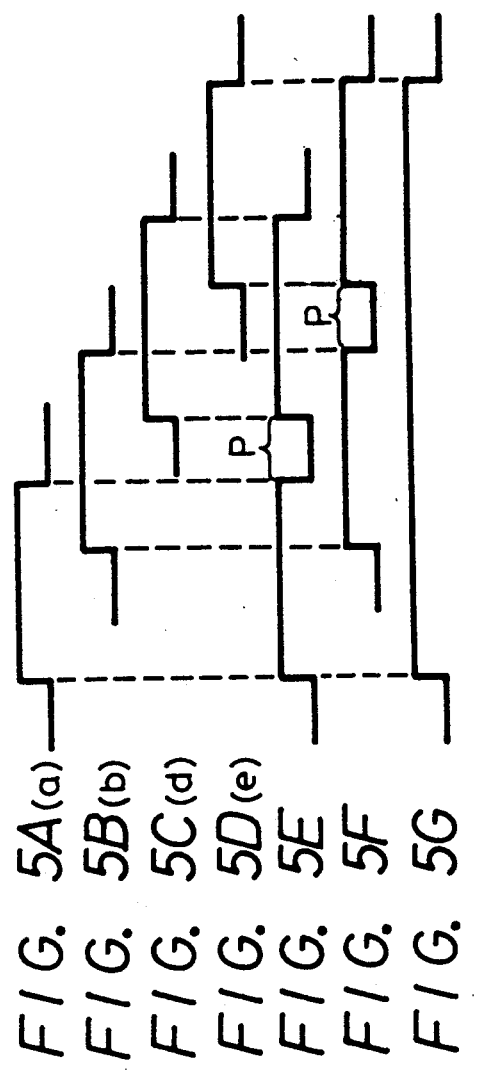
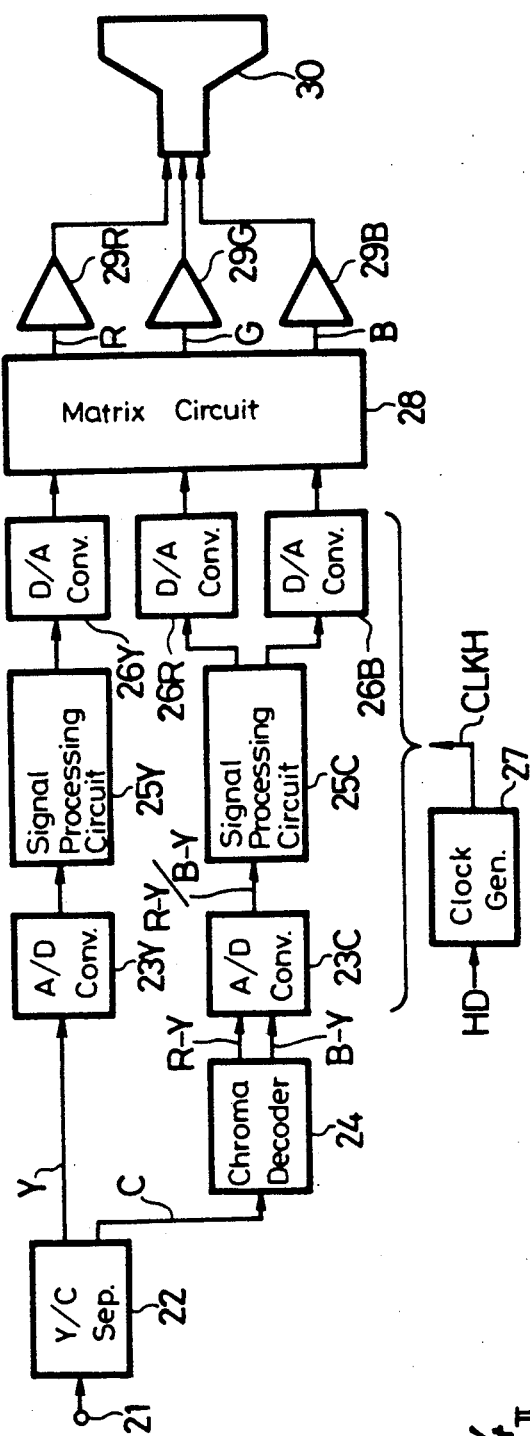
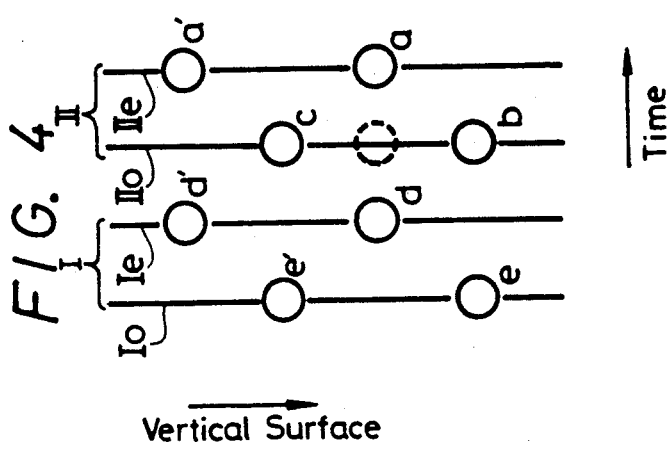

INTERPOLATION OF SCAN LINES FROM VIDEO SIGNALS HAVING INTERLACED SCAN LINES

BACKGROUND OF THE INVENTION

1. Field of the Invention

This invention relates to video signal processing circuits and, more particularly, to such a circuit which operates to improve the quality of a video signal by producing an interpolated scan line intermediate successive main scan lines normally present in a received video signal; and also by modifying the main scan line signals themselves.

2. Description of the Prior Art

Conventional television signals such as NTSC signals, normally are transmitted as so-called interlaced signals which, when reproduced on a conventional television receiver, produce a video picture formed of interlaced scan lines. The frame which constitutes one complete video picture actually is comprised of two successive interlaced fields. The first field consists of odd horizontal lines, such as lines numbered 1, 3, 5, etc., and the next succeeding field consists of the even numbered lines, that is, lines numbered 2, 4, 6, and so on. As is conventional, when the odd field of video signals is received by a conventional television receiver, the odd lines first are displayed; and when the next-following even field is received, the even lines are interlaced between the odd lines to reconstitute the complete video frame.

It is recognized that no even line information is reproduced when an odd field is received and, likewise, no information regarding the picture contents of the odd lines is reproduced when an even field is received. Of course, the inherent remanence of the CRT display tube phosphors provides continued display of the scan lines. Nevertheless, the overall quality of the video picture displayed on a conventional television receiver would be improved if, during each field interval, both odd and even line intervals are displayed. Stated otherwise, the quality of the video picture would be improved if, during a field interval, 525 lines rather than the usual 262 (or 263) lines are displayed.

A proposal to generate so-called interpolated scan lines of video information in response to the actual, main scan lines received in each field is found in NEC Technical Report, Vol. 41, No. 3/1988. A block diagram representing this proposal is set out in FIG. 1 herein. As illustrated, a conventional television signal, such as an NTSC signal, is received at an input terminal 1 and converted from its analog form to digital form by an analog-to-digital (A/D) converter 2. The digitized composite television signal then is separated by a luminance/chrominance (Y/C) separator 3 into its luminance and chrominance components. A typical Y/C separator includes a comb filter and, preferably, is of the so-called movement adaptive type. In addition to the comb filter, Y/C separator 3 may include a spectral filter circuit for separating the relatively lower frequency luminance components from the higher frequency chrominance components. Use of a comb filter generally is preferred to achieve Y/C separation, and its performance may be improved if there is little or no movement in the video scene represented by the video signals supplied thereto. The comb filter and spectral filtering circuitry included in the movement adaptive Y/C separator operate as a function of detected movement in the video scene then being received. Accordingly, Y/C separator 3 is coupled to a movement detector circuit 4 which is a conventional circuit adapted to sense whether movement is present from one scan line to the next. As one example, the movement detector circuit may detect the correlation between successively received horizontal lines.

The separated luminance component Y is supplied to a noise reducing circuit 5Y and, similarly, the separated chrominance component, after being decoded into color difference signals R-Y and B-Y by a chrominance decoder 6, is supplied to a noise reducing circuit 5C. The color difference signals R-Y and B-Y are supplied to the noise reducing circuit in time division multiplexed form.

Noise reducing circuits 5Y and 5C are conventional and are of the movement adaptive type. Accordingly, these noise reducing circuits are coupled to yet another movement detector 7 which controls the operation of the noise reducing circuits as a function of movement detected in the received video signals.

After noise reduction, the luminance signal is supplied to an interpolating circuit 8Y and, similarly, the noise-reduced time division multiplexed color difference signals are supplied to an interpolating circuit 8C. These interpolating circuits are similar in their function and operate to produce the normal, main scan line signals as well as interpolated scan line signals. Interpolated scan line signals are a relatively accurate approximation of the video information that is expected to be positioned between, for example, successive odd scan lines or successive even scan lines in an odd or even field. Thus, interpolating circuit 8Y generates main scan line luminance signals $Y_m$ and interpolated scan line luminance signals $Y_c$. Likewise, interpolating circuit 8C generates main scan line chrominance signals $R_m$-$Y_m$ and $B_m$-$Y_m$ (that is, time division multiplexed color difference signals) and interpolated scan line chrominance signals $R_c$-$Y_c$ and $B_c$-$Y_c$ (which also are in time division multiplexed form). For convenience hereafter, the time division multiplexed color difference signals are represented as $R_m$-$Y_m$/$B_m$-$Y_m$ for the main color difference scan lines signals and as $R_c$-$Y_c$/$B_c$-$Y_c$ for the interpolated color difference scan line signals.

Interpolating circuits 8Y and 8C are of the movement adaptive type and, thus, for proper control thereover, these circuits are coupled to still another movement detector circuit 9. That is, the operation of the interpolating circuits is controlled as a function of detected movement in the video scene represented by the received video signals. Interpolating circuit 8Y generates interpolated scan lines $Y_c$ of luminance information intermediate actual, main scan lines $Y_m$ of luminance information. Likewise interpolating circuit 8C generates interpolated scan lines $R_c$-$Y_c$/$B_c$-$Y_c$ of chrominance information intermediate actual, main scan lines $R_m$-$Y_m$/$B_m$-$Y_m$ of chrominance information.

The main and interpolated luminance and chrominance signals $Y_m$, $Y_c$, $R_m$-$Y_m$/$B_m$-$Y_m$ and $R_c$-$Y_c$/$B_c$-$Y_c$ are time compressed. Timebase compressing circuit 10Y is coupled to interpolating circuit 8Y to time compress the main and interpolated scan lines $Y_m$ and $Y_c$ of luminance information. Likewise, timebase compressing circuit 10C is coupled to interpolating circuit 8C to time compress the main and interpolated scan lines of time division multiplexed color difference signals $R_m$-$Y_m$/$B_m$-$Y_m$ and $R_c$-$Y_c$/$B_c$-$Y_c$.

The purpose of the timebase compressing circuits is to reduce the time period occupied by each main and interpolated scan line to one-half the conventional horizontal period. Thus, in the normal horizontal time interval, two successive scan lines of information are provided: the main scan line and the interpolated scan line. It will be appreciated that this enables the scanning circuitry of a cathode ray tube, such as CRT 18, to scan a main scan line followed by an interpolated line over a time interval normally occupied by a single conventional horizontal line interval.

The time compressed main and interpolated scan lines of luminance information produced by timebase compressing circuit 10Y are converted from digital to analog form by a D/A converter 11Y. Advantageously, timebase compressing circuit 10C functions to demultiplex the time division multiplexed main and interpolated scan lines of color difference signals, thereby separating the red and blue color difference signals which are, in turn, converted to analog form by D/A converters 11R and 11B, respectively. Thus, it is seen that D/A converter 11R receives a time-compressed main scan line of red color difference information $R_m$-$Y_m$, followed by an interpolated scan line of red color difference information $R_c$-$Y_c$. Likewise, D/A converter 11B receives a time-compressed main scan line of blue color difference information $B_m$-$Y_m$, followed by an interpolated scan line of blue color difference information $B_c$-$Y_c$. As a consequence, the D/A converters produce main analog scan line signals followed by interpolated analog scan line signals.

A matrix circuit 16 is coupled to D/A converters 11Y, 11R and 11B and operates in a conventional manner to combine the analog luminance and color difference signals to produce red, green and blue (RGB) signals, respectively. These RGB signals may be thought of as so-called "double speed" color signals because each occupies only one-half of a conventional horizontal line period. Such double speed color signals are amplified by amplifiers 17R, 17G and 17B, respectively, and supplied to the respective red, green and blue cathodes of CRT 18. Thus, although the video signals originally received at input terminal 1 are conventional interlaced signals formed of odd and even fields transmitted in succession, interpolating circuits 8Y and 8C, timebase compressing circuits 10Y and 10C and D/A converters 11Y, 11R and 11B, function to produce non-interlaced signals to improve the quality of the displayed video picture.

Of course, the various circuits illustrated and described in FIG. 1 must be supplied with clock signals for proper operation thereof. Clock generators 12 and 13 generate such clock signals for suitable operation of the digital circuits. Each clock generator is synchronized with a different component derived from the received video signal. In the illustrated circuitry, clock generator 12 generates a clock signal CLKC which is phase locked to the color burst signal SC normally included in the received composite video signal. Clock generator 13 generates a clock signal CLKH which is phase locked to the horizontal synchronizing signal HD included in the received video signal. Clock signals CLKC and CLKH are supplied to inputs a and b, respectively, of a selector switch 14 whose operation is controlled by a standard/non-standard identifying circuit 15.

The identifying circuit functions to determine whether the input video signal supplied to terminal 1 is a so-called standard signal or a non-standard signal. An example of a standard signal is a broadcast television signal; and an example of a non-standard signal is a video signal reproduced from a video tape recorder or other video playback device. As one embodiment thereof, identifying circuit 15 detects the chrominance subcarrier frequency $f_{sc}$ to determine if it is, in fact, equal to $455f_h/2$, where $f_h$ is the horizontal repetition frequency. If identifying circuit 15 detects the presence of a standard signal, switch 14 is controlled to supply clock signal CLKC generated by clock generator 12 to the illustrated digital circuits. Alternatively, if identifying circuit 15 detects a non-standard signal, selector switch 14 is changed over to couple clock signal CLKH generated by clock generator 13 to the digital circuits.

For example, let it be assumed that a non-standard signal, such as a video signal reproduced from a VCR, is supplied to input terminal 1. Let it be further assumed that the luminance signal included in this non-standard signal exhibits jitter. Nevertheless, as is conventional in many video tape recorders, the chrominance subcarrier of the reproduced signal is phase-locked by an automatic phase control circuit (APC) to prevent significant color disturbance in the video signal. If the clock signal CLKC, phase-locked to the chrominance subcarrier SC, is supplied to the digital circuits, Y/C separator 3 will operate quite satisfactorily. This is because the phase-locking of the clock signal to the chrominance subcarrier results in coincident samples from one line interval to the next, and this phase coincidence from line to line facilitates the Y/C separating capabilities of a comb filter. However, the existence of jitter in the luminance signal and, thus, in the horizontal synchronizing signal HD, may not be accompanied by identical jitter in the chrominance subcarrier. Consequently, if the clock signal CLKH, synchronized to the horizontal synchronizing signal HD, is used as the clock signal by the Y/C separating circuit, the samples generated during one line interval may not coincide with the samples generated during the next line interval. As a result, such small phase differences in the chrominance samples may impede the cancellation of the chrominance component from one line to the next in the comb filter. Thus, luminance/chrominance separation by the comb filter may not be satisfactory if the clock signal CLKH is used when a non-standard video signal is detected. But, this difficulty encountered by the Y/C separating circuit is contradicted by the improvement achieved in the operation of interpolating circuits 8Y and 8C by using the clock signal CLKH phase-locked to the horizontal synchronizing signal. Thus, when a non-standard signal, such as may be reproduced from a VCR, is present, it is preferred to use the clock signal CLKC to control the Y/C separator and to use the clock signal CLKH to control the interpolating circuits.

Of course, when a standard video signal is present, the luminance signal exhibits no jitter and, therefore, either the clock signal CLKC or the clock signal CLKH may be used by the Y/C separator and by the interpolating circuits. Identifying circuit 15 controls selector switch 14 to select clock signal CLKC or clock signal CLKH as a function of the degree of jitter which may be present in the received video signal.

In the previously proposed interpolating circuit shown in FIG. 1, the Y/C separator, the noise reducing circuits and the interpolating circuits rely on digital memories and on movement detecting circuitry for proper operation. As a result, the overall circuit arrangement is relatively complicated and the circuit architecture may be expected to be quite dense. This is further compounded by the addition of identifying circuit 15 and the change-over switching circuitry used to select clock signals CLKC or CLKH.

OBJECTS AND SUMMARY OF THE INVENTION

Therefore, it is an object of the present invention to provide an improved method and apparatus for processing video signals to improve the quality of those signals while avoiding the aforenoted disadvantages and drawbacks of prior art techniques.

Another object of this invention is to provide an improved technique for generating a non-interlaced video signal raster in response to conventional interlaced scan lines that are provided in successive fields.

A further object of this invention is to provide an improved technique by which interpolated scan lines are produced in response to received video signals constituted by conventional interlaced scan lines present in successive fields.

An additional object of this invention is to provide a video signal processing circuit of the aforementioned type of relatively reduced complexity and relatively simplified circuit architecture than has been proposed by the prior art.

Yet another object of this invention is to provide a technique for improving the quality of the video signals included in so-called main scan lines of a received, conventional video signal and, moreover, to generate interpolated scan lines intermediate those main scan lines so as to produce during each field interval a non-interlaced raster of video signal scan lines.

Various other objects, advantages and features of the present invention will be readily apparent from the ensuing detailed description, and the novel features will be particularly pointed out in the appended claims.

In accordance with one feature of this invention, interpolated scan lines of video signals are generated in response to received video signals that are comprised of conventional scan lines present in successive fields. The received video signals are delayed to provide a first scan line signal in a given field, the next succeeding scan line signal in that field, an interlaced scan line signal in the next succeeding field and an interlaced scan line signal in the next preceding field. The signal values of the next succeeding field interlaced scan line signal and the next preceding field interlaced scan line signal are combined to form a first combined scan line signal; and the signal values of the first scan line signal in the given field and the next succeeding scan line signal in that field are combined to form a second combined scan line signal. Each of the first and second combined scan line signals are level adjusted; and the level adjusted first and second combined scan line signals are added to produce an interpolated scan line signal intermediate succeeding main scan lines in the given field.

As an aspect of this feature, the signal values of the respective scan line signals are combined by averaging them.

As another aspect of this feature of the invention, the combined scan line signals are level adjusted as a function of detected motion in the video picture represented by the received video signals. Advantageously, the first combined scan line signal is increased relative to the second combined scan line signal in response to lesser detected motion, and the second combined scan line signal is increased relative to the first in response to greater detected motion. Thus, the interpolated scan line signal is derived predominantly from the first combined scan line signal when relatively little motion is detected and the interpolated scan line signal is derived predominantly from the second combined scan line signal when relatively large motion is detected. In one embodiment, the first combined scan line is amplified by a factor $(1-K)$, and the second combined scan line signal is amplified by the factor $K$, wherein $K$ various from 0 to 1 as detected motion varies from still to substantial movement.

As another feature of this invention, a main scan line signal in the given field is modified as a function of detected motion. This modification is achieved by combining the signal values of the first scan line in the given field and that same scan line in an adjacent frame to form a combined main scan line signal, level adjusting as a function of detected motion the relative values of the combined main scan line signal and the first scan line signal in the given field, and adding the level adjusted combined main scan line signal and first scan line signal to produce a modified scan line signal. Advantageously, the combined main scan line signal is formed by averaging the first scan line in the given field and that same scan line in the adjacent frame.

As another aspect of this feature, the value of the combined main scan line signal is increased relative to the value of the first scan line signal in response to lesser detected motion, and is decreased in response to greater detected motion. In one embodiment, this is achieved by amplifying the combined main scan line signal by the factor $(1-K)$ and amplifying the first scan line signal by the factor $K$, where, as before, $K$ varies from 0 to 1 as detected motion in the video picture varies from still to substantial movement.

As another feature of this invention, both the interpolated scan line signal and the modified main scan line signal are time-compressed such that the period of each is approximately one-half a conventional horizontal scan line.

In accordance with a still further feature of this invention, the video signals are composite video signals including luminance and chrominance components which are separated and separately processed to form interpolated luminance and chrominance scan line signals as well as luminance and chrominance modified main scan line signals, respectively.

In accordance with yet another feature of this invention, motion in the video picture is detected by sensing level differences between the interlaced scan line signals in the next succeeding and preceding fields, sensing level differences between the first scan line signal in the given field and the signal of that same scan line in an adjacent frame, and generating a motion indicating signal as a function of both sensed level differences. Preferably, the respective scan line signals whose level differences are sensed are luminance signals. The aforementioned motion indicating signal is generated by summing the respectively sensed level differences and generating a level adjusting coefficient signal $K$ as a function of the summed level differences. $K$ is used, as mentioned above, in generating the interpolated and modified main scan line signals, respectively.

BRIEF DESCRIPTION OF THE DRAWINGS

The following detailed description, given by way of example and not intended to limit the present invention solely thereto, will best be understood in conjunction with the accompanying drawings in which:

FIG. 2 is a block diagram of a television receiver in which the present invention finds ready application;

FIG. 4 is a schematic representation of the manner in which main, interlaced scan lines are scanned across the display of a television receiver, and further represents the manner in which an interpolated scan line signal is produced; and FIGS. 5A-5G are waveform diagrams which are useful in understanding the manner in which motion in a video picture is detected by the motion detector circuitry shown in FIG. 3.

DETAILED DESCRIPTION OF A PREFERRED EMBODIMENT

Figure 1:
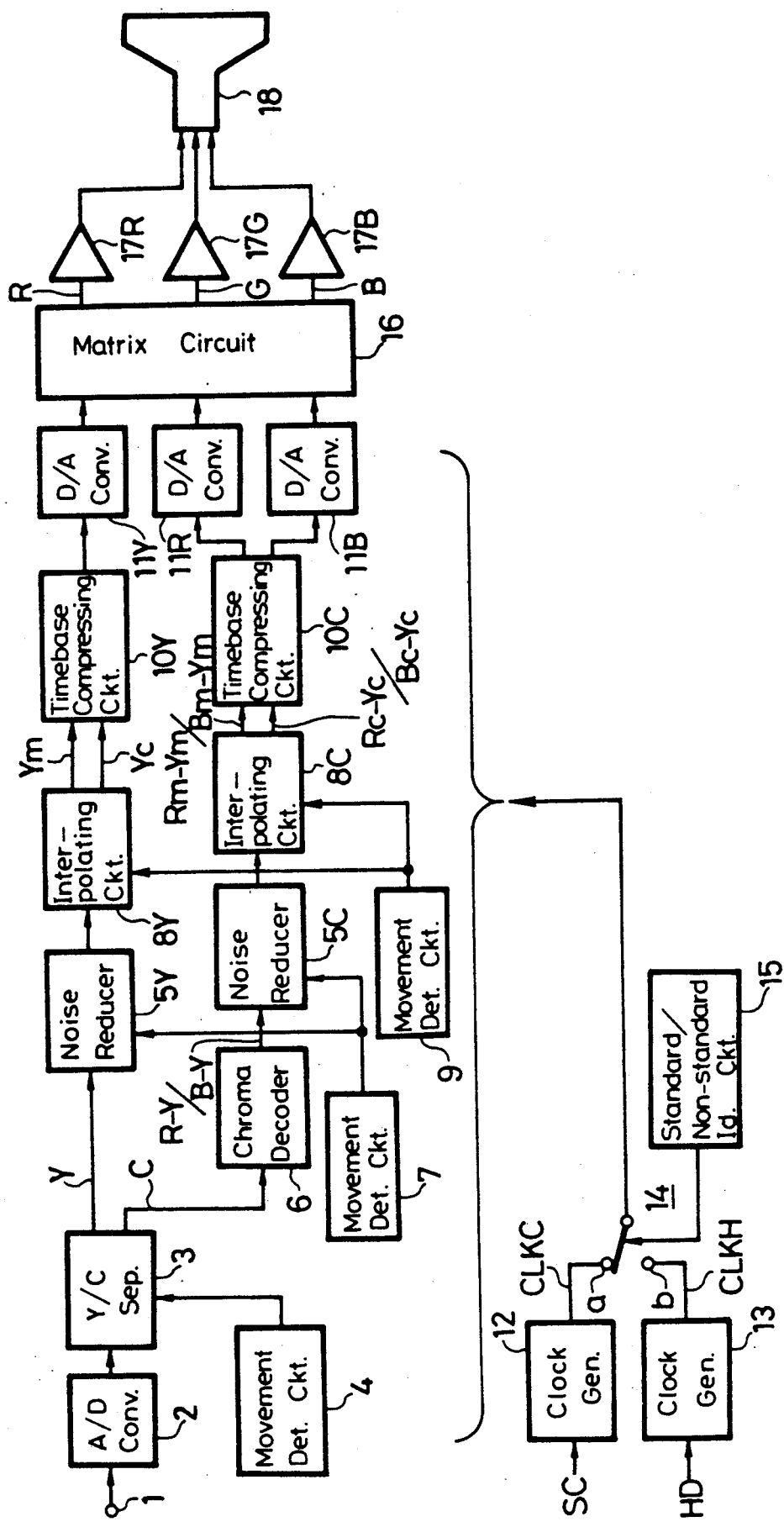
FIG. 1 is a block diagram of the aforedescribed prior art proposal to generate interpolated scan lines in response to actual, main scan lines that are present in received, interlaced fields.

The prior art proposal shown in FIG. 1 has been described above. To avoid unnecessary duplication, further description of this proposed arrangement is not provided hereafter.

Turning to FIG. 2, there is illustrated a block diagram of a television receiver in which the present invention finds ready application. It will be appreciated that not every circuit normally provided in a television receiver is illustrated in FIG. 2; and only that portion of a television receiver which is relevant to the present invention is illustrated. Thus, as shown, the television receiver includes a Y/C separator 22, signal processing circuits 25Y and 25C, a matrix circuit 28, and a cathode ray tube (CRT) 30. Y/C separator 22 is coupled to an input terminal 21 and preferably is formed of a comb filter which relies upon line correlation for satisfactory operation. Such a comb filter is known to those of ordinary skill in the art and no further description thereof is necessary.

Y/C separator 22 is coupled to luminance and chrominance channels to supply the separated luminance and chrominance components thereto, respectively. The luminance channel includes an A/D converter 23Y by which the separated luminance component Y is digitized prior to being processed in a signal processing circuit 25Y. In the chrominance channel, the separated chrominance component, designated as C, is decoded by a chrominance decoder 24 to produce separate red and blue color difference signals R-Y and B-Y, respectively. These separate, decoded color difference signals are digitized by an A/D converter 23C to produce digitized, time multiplexed color difference signals R-Y/B-Y which are supplied to a signal processing circuit 25C.

Figure 3:
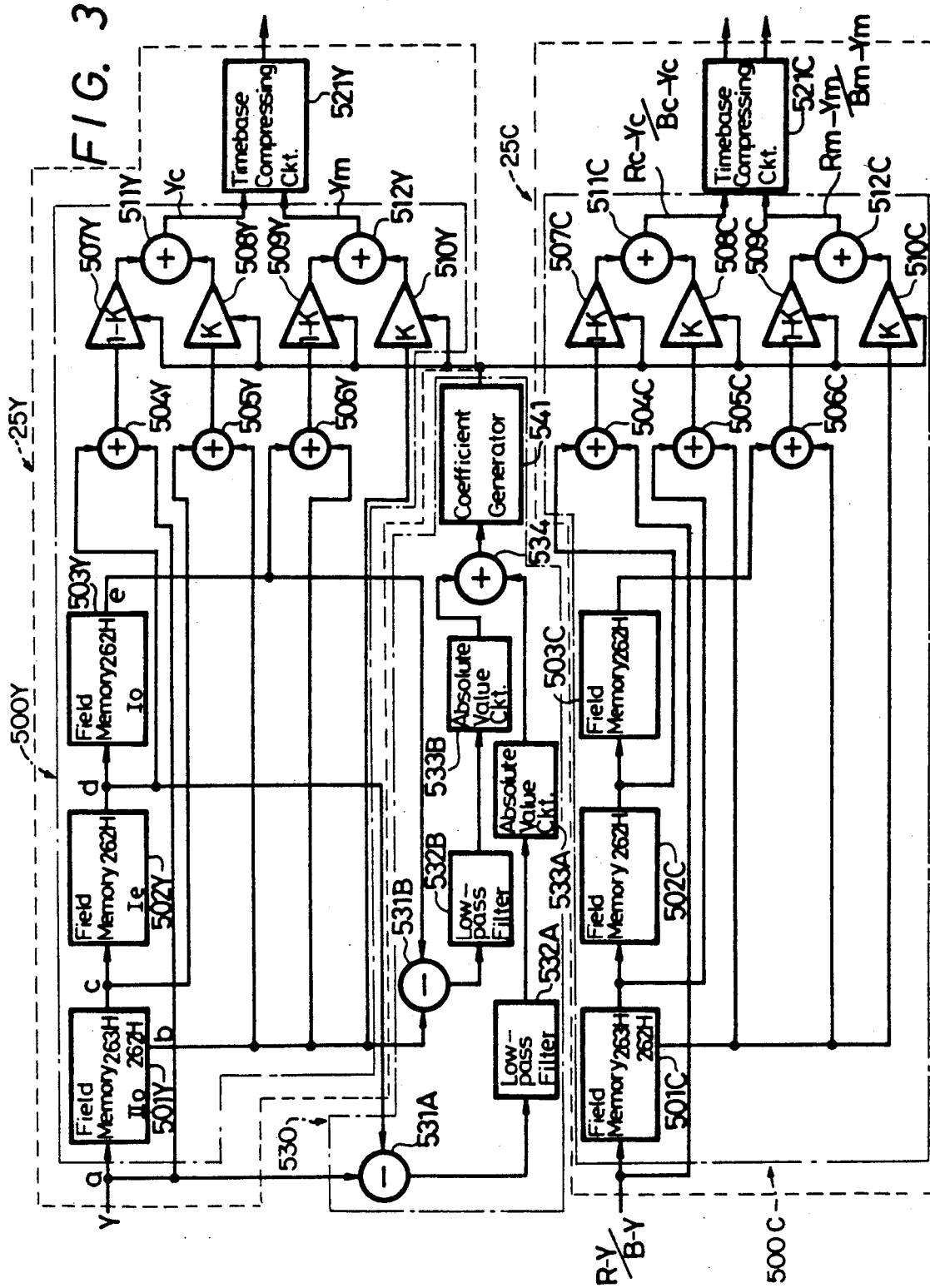
FIG. 3 is a block diagram of a preferred embodiment of the present invention.

The respective signal processing circuits 25Y and 25C are described in greater detail in FIG. 3. Suffice it to say, and as will be described in greater detail below, signal processing circuit 25Y produces interpolated luminance signal scan lines as well as modified luminance signal main scan lines. Likewise, signal processing circuit 25C produces color difference signal interpolated scan lines as well as color difference signal modified main scan lines. Thus, a non-interlaced raster of luminance signals comprised of main and interpolated scan lines is produced by signal processing circuit 25Y; and a similar non-interlaced raster of color difference main and interpolated scan lines is produced by signal processing circuit 25C. The respective signal processing circuits also include time compressing circuits to reduce the period of each interpolated and main scan line produced thereby to an interval equal to one-half the conventional horizontal scan line period. Thus, during the conventional horizontal line period, each signal processing circuit produces two so-called double-speed luminance or color difference signals such that two adjacent scan lines may be scanned in the same time period normally occupied by a single, interlaced horizontal line.

The double-speed luminance scan line signals produced by signal processing circuit 25Y are supplied to a D/A converter 26Y wherein they are converted to analog form. Signal processing circuit 25C functions to demultiplex the double-speed color difference signals which are supplied to respective D/A converters 26R and 26B for conversion to analog form.

The resultant analog, double-speed luminance and color difference signals are combined in a matrix circuit 28, which may be of conventional construction, to produce the usual red, green and blue (RGB) double-speed color video signals. These RGB signals are amplified by suitable amplifiers 29R, 29G and 29B, respectively, and supplied to the individual color cathodes of CRT 30. The resultant color picture displayed on CRT 30 is comprised of non-interlaced scan lines which are displayed during each field interval. For example, instead of the 262 (or 263) horizontal lines which normally are present during each field interval, CRT 30 displays 525 scan lines during each field. It will be appreciated that this increase in the apparent resolution of the video information displayed during each field improves the quality of the television picture.

Of course, clock signals are supplied to the A/D converters, the signal processing circuits and the D/A converters for proper operation thereof. As illustrated in FIG. 2, a clock signal CLKH is generated by a clock generator 27 in response to the horizontal synchronizing signal HD which is separated from the video signals supplied to input terminal 21. This clock signal CLKH, or a derivative thereof, is supplied to the illustrated digital circuits. Clock generator 27 includes a phase-locked loop by which clock signal CLKH is phase locked to the separate horizontal synchronizing signal HD.

By comparing the circuits shown in FIG. 2 with the prior art proposal of FIG. 1, it is readily seen that the FIG. 2 arrangement is substantially simplified. In particular, the need for separate clock generators, such as previously described clock generators 12 and 13, is obviated. Thus, the same clock signal CLKH is used in the FIG. 2 embodiment notwithstanding whether the video signal supplied to input terminal 21 is a standard or non-standard signal. The requirement of selector switch 14 found in the prior art proposal is avoided. A further improvement and simplification in the signal processing circuit is described below with reference to FIG. 3.

One embodiment of signal processing circuits 25Y and 25C now will be described in conjunction with FIG. 3. Signal processing circuit 25Y includes a scan line interpolating circuit 500Y as well as a timebase compressing circuit 521Y. Similarly, signal processing circuit 25C includes a scan line interpolating circuit 500C as well as a timebase compressing circuit 521C. In addition, a motion (or movement) detector 530 is coupled to some of the components included in scan line interpolating circuit 500Y to control the operation of interpolating circuits 500Y and 500C.

Scan line interpolating circuit 500Y is comprised of a delay circuit coupled to receive the separated, digitized luminance component Y for delaying the luminance component by a period of time sufficient to provide the following outputs, concurrently: a first scan line signal b in a given field, the next succeeding scan line signal c in that field, an interlaced scan line signal a in the next succeeding field (that is, a scan line that is displayed intermediate lines b and c) and an interlaced scan line signal d in the next preceding field. In addition, the delay circuitry functions to provide a scan line signal e corresponding to scan line signal b but provided in the next preceding frame. Those of ordinary skill in the art will appreciate that various conventional delay circuitry may be used to provide the aforementioned concurrent outputs. For example, the delay circuitry may comprise a delay line that is suitably tapped to yield the aforementioned scan line signals a–e. Preferably, however, the delay circuitry is comprised of three separate field memories, illustrated as field memories 501Y, 502Y and 503Y, respectively, connected in cascade. In the present embodiment, the field memories are digital circuits, such as shift registers. Alternatively, each field memory may comprise an addressable memory device into which each digitized scan line is written and read. For a purpose soon to be appreciated, field memories 502Y and 503Y may impart a delay equal to 262 horizontal line periods, or 262H, to the luminance signal supplied thereto. Field memory 501Y preferably imparts a delay on the order of 263H and, additionally, includes an additional output terminal to supply a scan line that is delayed by an interval of 262H. It is appreciated, therefore, that the outputs of field memory 501Y produced at its 263H and 262H outputs constitute successive scan lines in a given field.

To best appreciate the scan line signals which are provided concurrently by field memories 501Y–503Y, reference is made to FIG. 4, which is a diagrammatic representation of the manner in which successive scan lines in successive field intervals are traced across the display of CRT 30. FIG. 4 may be thought of as a side view of the CRT display during successive field intervals. For example, in a first frame, designated frame I, an odd field $I_o$ first is displayed, followed by the even field $I_e$. Then, in frame II, an odd field $II_o$ is displayed followed by the even field $II_e$. Returning to odd field $I_o$ of frame I, successive scan lines are traced across the CRT display from the top of the display to its bottom. It will be noted that FIG. 4 represents the top of the CRT display at the bottom of the figure. Thus, for the portion of odd field $I_o$ that is illustrated, scan line e first is traced followed by scan line e'. Succeeding scan lines in this odd field are traced in successive scan line periods, as is conventional.

After odd field $I_o$ is traced, even field $I_e$ is reproduced. In displaying even field $I_e$, scan line d followed by next scan line d' are traced. By comparing the illustrated scan lines in fields $I_o$ and $I_e$, it is seen that scan line d of even field $I_e$ is interlaced with scan lines e and e' of field $I_o$. When the interlaced scan lines are displayed on CRT 30, scan line d is traced intermediate scan lines e and e'.

In similar manner, frame II contains interlaced odd field $II_o$ and even field $II_e$. Odd field $II_o$ contains successive scan lines b and c; while even field $II_e$ contains successive scan lines a and a'. By comparing fields $II_o$ and $II_e$, it is seen that scan line a of field $II_e$ is interlaced with scan lines b and c of field $II_o$. For the purpose of the ensuing description, the interlaced scan lines of the respective fields which are depicted by solid lines and are referred to as "main" scan lines. These are, of course, the video signals which comprise the received interlaced fields. The scan line shown as a broken line intermediate main scan lines b and c in field $II_o$ is referred to as an "interpolated" scan line because it is generated to be positioned intermediate the main scan lines of a field. In FIG. 4, the interpolated scan line is generated to be intermediate main scan lines b and c of field $II_o$. As will be described, the video information, or content, of the interpolated scan line is derived from the information contained in adjacent scan lines b and c as well as from the information contained in the main scan lines a and d, that is, the main scan lines which occupy the same position as the interpolated scan line but are in the next preceding field $I_e$ and in the next succeeding field $II_e$. It will be apparent that an interpolated scan line is generated intermediate every two main scan lines in every field.

Returning to FIG. 3, it is seen that the signals provided at the respective outputs of cascaded field memories 501Y, 502Y and 503Y are coupled to predetermined ones of combining circuits 504Y, 505Y and 506Y. In the preferred embodiment herein, each combining circuit preferably comprises an averaging circuit to produce an output signal whose level is the average of the signal levels supplied thereto. Each combining circuit thus may include a summing circuit and a divide-by-two circuit It is appreciated that each combining, or averaging circuit is a digital device.

As shown, combining circuit 504Y is coupled to the input of field memory 501Y to receive scan line a; and this combining circuit also is coupled to the output of field memory 502Y to receive scan line d. Combining circuit 505Y is coupled to the 262H output of field memory 501Y to receive scan line b, and also to the 263H output of field memory 501Y to receive scan line c. Combining circuit 506Y is coupled to the 262H output of field memory 501Y to receive scan line b, and also to the output of field memory 503Y to receive scan line e.

Combining circuits 504Y and 505Y are adapted to produce first and second combined scan line signals, respectively. These first and second combined scan line signals are coupled to a summing circuit 511Y by way of level adjusting circuits 507Y and 508Y, respectively. Each level adjusting circuit is adapted to adjust the level of the combined scan line signal supplied thereto by a variable factor. Stated otherwise, the value of the combined scan line signal level is multiplied by the level adjusting factor. This is achieved by conventional digital techniques known to those of ordinary skill in the art. FIG. 3 illustrates this level adjusting operation as being carried out by a gain controlled amplifier whose gain is determined by a level adjusting coefficient K produced by coefficient generator 541, to be described.

The signal levels of the first and second combined scan line signals summed by summing circuit 511Y are level adjusted inversely with respect to each other. Accordingly, an amplifier 507Y (or digital equivalent) having a gain represented as $(1-K)$ is adapted to amplify the first combined scan line signal produced by combining circuit 504Y; and a variable gain amplifier 508Y (or digital equivalent) whose gain is represented as K is adapted to amplify the second combined scan line signal produced by combining circuit 505Y. Summing circuit 511Y functions to produce an interpolated scan line signal $Y_c$ which, in turn, is coupled to timebase compressing circuit 521Y.

Combining circuit 506Y is coupled to a summing circuit 512Y by way of a level adjusting circuit 509Y. This level adjusting circuit may be similar to aforedescribed level adjusting circuit 507Y and, in the interest of brevity, further description thereof is not provided. It will be appreciated that combining circuit 506Y produces a combined main scan line signal by averaging the scan line output e produced by field memory 503Y and the scan line output b produced at output 262H of field memory 501Y. This same scan line output b is coupled to summing circuit 512Y by way of a level adjusting circuit 510Y, which is similar to aforedescribed level adjusting circuit 508Y.

The output of summing circuit 512Y is supplied as a modified main scan line signal to timebase compressing circuit 521Y. This timebase compressing circuit is adapted to compress the interpolated scan line signal and the modified main scan line signal supplied thereto so as to reduce the time period occupied by each to one-half the conventional horizontal period. I will be appreciated that timebase compressing circuit 521Y thus carries out substantially the same function as was described above in conjunction with timebase compressing circuit 10Y of FIG. 1.

The level adjusting coefficient K which determines the gain of each of amplifiers 507Y–510Y is produced by movement detector 530. The function of this movement detector is to determine frame-to-frame differences, that is, the magnitude of signal difference in a scan line of one field and the very same line in the next adjacent frame. For example, and with reference to FIG. 4, the signal difference between scan lines a and d in adjacent frames II and I is detected and used as an indication of movement in the video scene represented by the scan lines. Likewise, the difference between scan lines b and e of frames II and I provides a further indication of movement in the video scene. Preferably, the luminance signal of the respective scan lines is used to detect motion. If the difference between the signal levels of scan lines a and d is zero and, likewise, if the difference between the signal levels of scan lines b and e is zero, it may be concluded that there is no movement in the video scene represented by frames II and I. Conversely, the magnitude of the determined difference between the signal levels of these scan lines represents the degree of movement from one frame to the next.

Returning to FIG. 3, movement detector 530 is comprised of difference circuits 531A and 531B, absolute value circuits 533A and 533B, a summing circuit 534 and coefficient generator 541. Difference circuit 531A, which may be a digital subtractor, is coupled to receive the input of field memory 501Y and the output of field memory 502Y. It is appreciated that this difference circuit functions to determine the difference between the signal levels of scan lines a and d.

The output of difference circuit 531A is coupled to absolute value circuit 533A by way of a low pass filter 532A. The absolute value circuit is adapted to produce a signal, such as a digital signal, representing the absolute value of the lower frequency components of the difference signal produced by difference circuit 531A and passed by low pas filter 532A. The output of absolute value circuit 533A, that is, the absolute value of the determined difference, is supplied to summing circuit 534.

Difference circuit 531B is coupled to the 262H output of field memory 501Y and also to the output of field memory 503Y. It is appreciated that difference circuit 531B is adapted to determine the difference between the signal levels of scan lines b and e.

The output of difference circuit 531B is coupled to absolute value circuit 533B by way of a low pass filter 532B. This low pass filter is similar to low pass filter 532A and absolute value circuit 533B is similar to aforementioned absolute value circuit 533A. The output of absolute value circuit 533B, that is, the absolute value of the determined difference between the signal levels of scan lines b and e, is coupled to summing circuit 534.

Coefficient generator 541 is coupled to summing circuit 534 and is adapted to generate the level adjusting coefficient K as a function of the output of this summing circuit. Preferably, the level adjusting coefficient K generated by coefficient generator 541 exhibits a value between 0 and 1 depending upon the magnitude of movement determined by movement detector 530. In the absence of movement, that is, if the frame-to-frame picture content is constant, $K=0$. However, in the presence of maximum movement, that is, when significant differences are found in the video picture content of one frame relative to its adjacent frame, $K=1$.

Before describing the remaining circuitry illustrated in FIG. 3, the operation of the interpolating circuit and scan line modifying circuit for the luminance channel will be discussed. Let it be assumed that, at any given time, field memories 501Y–503Y provide scan lines b–e, as shown in FIG. 4. When these scan lines are provided, the scan line then being supplied to field memory 501Y corresponds to scan line a shown in FIG. 4. Combining circuit 504Y averages scan lines a and d to produce, as an output, a combined scan line signal that may be represented as $(a+d)/2$. Likewise, combining circuit 505Y averages scan lines b and c which, of course, are successive scan lines in the same field, to produce an averaged scan line signal that may be represented as $(b+c)/2$. In the foregoing representations, it is appreciated that each of a–d represents the luminance signal level of the respective scan lines.

If the contents of field memory 501Y are thought of as a given field, then the contents of field memory 502Y may be thought of as the next preceding field. Accordingly, and as shown in FIG. 4, if scan line b represents a first scan line in the given field, then scan line c represents the next succeeding scan line in that given field. It is appreciated that scan line d constitutes an interlaced scan line (i.e. when displayed line d is intermediate and, thus, interlaced with, scan lines b and c) of the next preceding field; and scan line a is an interlaced scan line in the next succeeding field. Of course, scan lines a and d occupy the same position in successive frames. Finally, scan line e is seen to be the same scan line as scan line b, but in the frame next preceding the given frame.

Thus, combining circuit 504Y produces a first combined scan line signal that is the average of the signal levels of scan lines a and d; and, in the absence of any movement in the video picture, would provide a good approximation of an interpolated scan line intermediate scan lines b and c of the given field. Combining circuit 505Y produces a second combined scan line signal which is the average of successive scan lines b and c. If significant movement is detected in the video picture, the averaging of scan lines b and c provides a good approximation of the information that would be included in the interpolated scan line. Of course, in the absence of motion, K=0 and the second combined scan line signal, that is, the average of scan lines b and c, is reduced to approximately zero, while the first combined scan line signal, that is, the average of scan lines a and d, is amplified with maximum gain (assumed herein to be a maximum gain of 1). Depending upon the value of the level adjusting coefficient K, the first and second combined scan line signals are level adjusted relative to each other such that the signal value of the first combined scan line is reduced while the signal level of the second combined scan line is increased in response to greater detected movement. The converse is true when lesser movement in the video picture is detected.

Summing circuit 511Y sums the level adjusted, relative values of the averaged scan lines to produce the interpolated scan line signal $Y_c$. This interpolated scan line signal is derived predominantly from the first combined scan line (that is, the average of scan lines a and d) when relatively little movement is detected in the video picture; and is derived predominantly from the second combined scan line signal (that is, the average of scan lines b and c) when relatively large movement is detected.

It is appreciated that the interpolated scan line signal $Y_c$ exhibits a period equal to the conventional horizontal line interval. Timebase compressing circuit 521Y compresses the period to one-half the conventional horizontal interval.

From the foregoing, it is seen that the average of scan lines a and d may be thought of as representing the interpolated scan line of a still picture and the average of scan lines b and c may be thought of as representing the interpolated scan line of a moving picture. Proportionate levels of the still and moving interpolated scan lines are combined in summing circuit 511Y to produce an accurate interpolated scan line $Y_c$.

Now, the manner in which the actual (or main) scan line signal is modified to improve its quality is described. Combining circuit 506Y produces a combined main scan line signal by averaging scan lines b and e. As mentioned above, and as shown in FIG. 4, scan line e occupies the same position as scan line b in the next preceding frame. In the absence of frame-to-frame movement, it is expected that the signal levels of scan lines b and e will be approximately equal and, thus, the average thereof will be about the same as the signal level of scan line b. The combined main scan line signal (that is, the average of scan lines b and e) is level adjusted and summed with level adjusted scan line b of the given field. In the absence of movement in the video picture, the combined main scan line signal, that is, the average of scan lines b an e, is used to represent the main scan line b. Conversely, if substantial movement is detected in the video picture, scan lines b and e may differ from each other and the signal level of scan line b is used. Thus, the combined main scan line signal and the actual scan line signal b are inversely level-adjusted relative to each other and then summed by summing circuit 512Y to produce a modified main scan line signal $Y_m$. This modified main scan line signal $Y_m$ occupies a time period equal to that of a conventional horizontal line interval. Timebase compressing circuit 521Y compresses this interval to one-half the conventional line period. Thus, during a time period normally occupied by a conventional horizontal line interval, time base compressing circuit 521Y provides a main scan line signal $Y_m$ followed by an interpolated scan line signal $Y_c$. The main and interpolated scan line signals may be thought of as "double-speed" scan lines because the period of each has been reduced by one-half.

Movement detector 530 generates the level adjusting coefficient K as a function of two frame difference signals, that is, the difference signal produced by difference circuit 531A and the difference signal produced by difference circuit 531B. Both difference signals represent movement in frame II relative to frame I. The difference signal produced by difference circuit 531A represents signal level differences between scan lines a and d, that is, signal level differences between the same scan line in field $II_e$ relative to that of field $I_e$. The difference signal produced by difference circuit 531B represents the signal level difference between scan lines b and e, that is, signal level differences between the same scan line in field $II_o$ relative to that of field $I_o$. Of course, the low pass filters remove from the respective frame difference signals higher frequency noise components as well as a so-called dot interference component, which also exhibits higher frequency characteristics. The absolute value circuits are analogous to full wave rectifiers and produce output signal levels representative of the respective frame difference signals, without regard to polarity.

It will be appreciated that the output of summing circuit 534, which determines the magnitude of level adjusting coefficient K, increases as frame-to-frame movement increases, and decreases as the magnitude of such movement decreases. The level adjustment coefficient K, which determines the proportional ratio between still picture and moving picture components which are used to derive the interpolated and main scan line signals, may be produced by a look-up table as a function of this output of summing circuit 534.

It is recognized that scan line interpolating circuit 500Y receives the digitized, separated luminance component Y. A separate, substantially similar scan line interpolating circuit 500C is provided to derive the interpolated scan line chrominance component. Thus, signal processing circuit 25C of FIG. 2 is illustrated in FIG. 3 as being comprised of field memories 501C–503C, summing circuits 504C–506C, level adjusting circuits 507C–510C, summing circuits 511C and 512C and timebase compressing circuit 521C. Field memories 501C–503C function to provide the chrominance components of scan lines a–e, shown in FIG. 4. Here, the chrominance components are comprised of time multiplexed color difference signals R-Y/B-Y.

Combining circuit 504C is similar to aforedescribed combining circuit 504Y and averages the chrominance signal values of scan lines a and d. Combining circuit 505C is similar to aforedescribed combining circuit 505Y and averages the chrominance signal values of scan lines b and c. These averaged chrominance signal values are inversely level adjusted relative to each other by level adjusting circuits 507C and 508C and combined in summing circuit 511C to produce the interpolated scan line chrominance signal $R_c\text{-}Y_c/B_c\text{-}Y_c$, represented by the broken scan line in FIG. 4. This interpolated scan line chrominance signal is timebase compressed by timebase compressing circuit 521C which also serves to demultiplex the color difference signals. Thus, the interpolated red color difference scan line $R_c\text{-}Y_c$ is provided at one output of the timebase compressing circuit and the interpolated blue color difference scan line $B_c\text{-}Y_c$ is provided at the other output of this timebase compressing circuit.

Combining circuit 506C functions to average the chrominance signal values of scan lines b and e to produce an average main scan line chrominance signal. The level of this average main scan line chrominance signal is inversely adjusted relative to the level of the chrominance signal of scan line b by level adjusting circuits 509C and 510C. Similar to aforedescribed level adjusting circuits 509Y and 510Y, level adjusting circuits 509C and 510C may be thought of as amplifiers, with amplifier 509C exhibiting a gain of $(1-K)$ and with amplifier 510C exhibiting a gain K, where K is the level adjustment coefficient produced by coefficient generator 541. It is seen that this relative level adjusting operation increases the level of the combined main scan line signal produced by combining circuit 506C relative to the chrominance signal of scan line b in response to lesser detected motion in the video picture (i.e. when K is approximately 0); and the chrominance signal level of scan line b is increased relative to that of the combined main scan line signal when more substantial motion is detected (i.e. when K is approximately 1).

The level adjusted combined main scan line produced by level adjusting circuit 509C and the level adjusted scan line b produced by level adjusting circuit 510C are added in summing circuit 512C. The output of summing circuit 512C thus comprises a modified main scan line chrominance signal formed of time division multiplexed red and blue color difference signals, illustrated as $R_m$-$Y_m$/$B_m$-$Y_m$. This modified main scan line chrominance signal is demultiplexed and time compressed by timebase compressing circuit 521C in a manner similar to that carried out for the interpolated scan line chrominance signal $R_c$-$Y_c$/$B_c$-$Y_c$. Thus, the interval occupied by the modified main scan line chrominance signal is reduced to approximately one-half the conventional horizontal period. Timebase compressing circuit 521C thereby produces so-called double speed scan line signals of chrominance information such that two adjacent scan lines are scanned in the same time period normally occupied by a single interlaced horizontal line.

It is recognized that signal processing circuit 500C is substantially the same as signal processing circuit 500Y and operates on the chrominance component included in the separated video signal. The separated luminance and chrominance components thus are processed separately to provide interpolated scan lines and modified main scan lines of the luminance and color difference components of the video signal.

The averaged scan line signals (b+e)/2, as produced by summing circuits 506Y and 506C, and the averaged scan line signals (a+d)/2, as produced by combining circuits 504Y and 504C, may be thought of as interframe average signals used when there is relatively little frame-to-frame movement of the video picture, as when K is close to zero. These averaged signal levels tend to cancel dot interference components (which are chrominance components) contained in the luminance signal Y because such interfering chrominance components are phase reversed from frame to frame. Similarly, the averaged signal values produced by combining circuits 504C and 506C tend to cancel the cross color components contained in the time division multiplexed color difference signals R-Y/B-Y. This may be mathematically explained as follows:

The chrominance signal derived from Y/C separator 22 of FIG. 2 may be expressed as $Y_H + \cos 2\pi f_{sc}t$, where $Y_H$ is the luminance signal component and $f_{sc}$ is the color subcarrier frequency. This chrominance signal may be demodulated by multiplying it with the color subcarrier, whereby the demodulated chrominance signal may be expressed as (chrominance signal) $\times \sin 2\pi f_{sc}t = Y_H \sin 2\pi f_{sc}t + C_0$. The component $Y_H \sin 2\pi f_{sc}t$ constitutes the cross color component which is equiphased with the chrominance signal component and is phase-inverted from frame to frame such that the interframe cross color components (i.e. b+e or a+d) cancel. Thus, interpolating circuit 500C functions to remove these undesired cross color components.

Let it further be assumed that a noise signal of normalized amplitude $1/\sqrt{2}$ is randomly present. Since the frame-to-frame scan lines are averaged (i.e. a+d and b+e), the signal-to-noise ratio of the luminance and chrominance signals is increased.

As discussed above, movement in the video picture is detected as a function of two frame-to-frame difference signals. Subtracting circuit 531A detects the difference between scan lines a and d and subtracting circuit 531B detects the difference between scan lines b and e. The purpose of using two frame difference signals is to detect rapid movement during the period of a field (i.e. movement on the order of 1/60 second). This is best understood by referring to FIGS. 5A–5G. Let it be assumed that FIGS. 5A–5D are waveform representations of the luminance components included in scan lines a, b, d and e, respectively. The difference between scan lines a and d is represented by the waveform shown in FIG. 5E and the difference between scan lines b and e is represented by the waveform shown in FIG. 5F. Because of the rapid movement from one frame to the next, that portion P of the signal shown in FIG. 5E represents zero movement between scan lines a and d. Likewise, that portion P' of the waveform shown in FIG. 5F represents zero movement between scan lines b and e. If only one frame difference signal is used to detect movement, for example, if only the waveform shown in FIG. 5E is used, portion P will produce a level adjusting coefficient K that erroneously indicates little movement. But, by using both frame difference signals, the waveforms shown in FIGS. 5E and 5F are summed and the value of the level adjusting coefficient K is not erroneously generated.

When the present invention is compared to the proposal described above in conjunction with FIG. 1, it is seen that interpolated scan lines of both luminance and chrominance information are produced accurately and, moreover, the quality of the main scan lines is improved, thus increasing the quality of the image displayed by CRT 30. The very same cascaded field memories are used to produce both the interpolated scan line and the improved main scan line. Moreover, only one movement detector 530 need be provided; thus simplifying the overall circuitry and reducing the density of the circuit architecture. Such reduction in complexity also is attributed to the fact that only a single clock generator need be provided, for example, a clock generator phase locked to the horizontal synchronizing signal HD to produce the clock signal CLKH. The added complexity and additional circuitry that would be required by yet another clock generator, a change-over switch and an identifying circuit, as was described in conjunction with FIG. 1, is avoided.

Yet another advantageous feature achieved by the present invention is the removal of dot interference and cross color components which might not otherwise be removed by an analog Y/C separator. Accordingly, the quality of the displayed video image will not be deteriorated because of such dot interference and cross color components.

Moreover, by detecting movement on the basis of two frame difference signals, relatively quick movement that may be present from one field to the next will be detected. Such quick movement might not otherwise be sensed if only a single frame difference signal is used.

While the present invention has been particularly shown and described with reference to a preferred embodiment, it will be readily appreciated by those of ordinary skill in the art that various changes and modifications may be made without departing from the spirit and scope of the invention. Some of these changes have been discussed above and others will be recognized as being equivalent to the disclosed embodiment. It is, therefore, intended that the appended claims be interpreted as including the embodiment disclosed herein, the alternatives mentioned previously as well as those that are equivalent thereto.

What is claimed is:

1. A method of generating scan lines of video signals in response to received video signals comprised of conventional scan lines of successive fields, said method comprising the steps of delaying the received video signals to provide a first scan line signal in a given field, the next succeeding scan line signal in that field, an interlaced scan line signal in the next succeeding field and an interlaced scan line signal in the next preceding field; combining the signal values of the next succeeding field interlaced scan line signal and the next preceding field interlaced scan line signal to form a first combined scan line signal; combining the signal values of the first scan line signal in said given field and the next succeeding scan line signal in that field to form a second combined scan line signal; level adjusting each of the first and second combined scan line signals by detecting motion in a video picture represented by the received video signals, and adjusting the relative levels of said first and second combined scan line signals as a function of said detected motion; adding the level adjusted first and second combined scan line signals to produce an interpolated scan line signal intermediate succeeding main scan lines in said given field; and modifying a main scan line signal in said given field as a function of said detected motion.

2. The method of claim 1 wherein said step of modifying said main scan line signal comprises combining the signal values of said first scan line in said given field and that same scan line in an adjacent frame to form a combined main scan line signal; level adjusting as a function of said detected motion the relative values of said combined main scan line signal and said first scan line signal in said given field; and adding the level adjusted combined main scan line signal and first scan line signal to produce a modified main scan line signal.

3. The method of claim 2 wherein the signal values of said first scan line in said given field and that same scan line in the adjacent frame are averaged to form said combined main scan line signal.

4. The method of claim 2 wherein the step of level adjusting the relative values of said combined main scan line signal and said first scan line signal in said given field comprises increasing the combined main scan line signal value relative to the first scan line signal value in response to lesser detected motion in said video picture; and increasing the first scan line signal value relative to the combined main scan line signal value in response to greater detected motion in said video picture.

5. The method of claim 4 wherein said steps of increasing the relative signal levels of the combined main scan line signal and of the first scan line signal comprise generating a gain factor K, wherein K varies from 0 to 1 as detected motion in said video picture varies from still to substantial movement; amplifying said combined main scan line signal by a factor $(1-K)$; and amplifying said first scan line signal by a factor K.

6. The method of claim 2 further comprising the step of time-compressing both said interpolated scan line signal and said modified main scan line signal such that the period of each is approximately one half a conventional horizontal scan line period.

7. The method of claim 6 further comprising the steps of digitizing the received video signals to produce digital video signals that are delayed, combined and level adjusted; and converting the time-compressed interpolated scan line signal and modified scan line signal from digital to analog form.

8. The method of claim 2 wherein said video signals are luminance signals.

9. The method of claim 2 wherein said video signals are chrominance signals.

10. The method of claim 2 wherein said video signals are composite video signals including luminance and chrominance components; and further comprising the step of separating the luminance and chrominance components prior to the delaying, combining and level adjusting thereof, so as to form interpolated scan line signals and modified main scan line signals of the luminance and chrominance components, respectively.

11. A method of generating scan lines of video signals in response to received video signals comprised of conventional scan lines of successive fields, said method comprising the steps of delaying the received video signals to provide a first scan line signal in a given field, the next succeeding scan line signal in that field, an interlaced scan line signal in the next succeeding field and an interlaced scan line signal in the next preceding field; combining the signal values of the next succeeding field interlaced scan line signal and the next preceding field interlaced scan line signal to form a first combined scan line signal; combining the signal values of the first scan line signal in said given field and the next succeeding scan line signal in that field to form a second combined scan line signal; level adjusting each of the first and second combined scan lien signals including the steps of detecting motion in a video picture by sensing level differences between said interlaced scan line signals in the next succeeding and preceding fields, sensing level differences between said first scan line signal in said given field and the signal of that same scan line in an adjacent frame and generating a motion indicating signal as a function of both sensed signal level differences, and adjusting the relative levels of said first and second combined scan line signals as a function of said motion indicating signal; and adding the level adjusted first and second combined scan line signals to produce an interpolated scan line signal intermediate succeeding main scan lines in said given field.

12. The method of claim 11 wherein the respective scan line signals whose level differences are sensed are luminance signals.

13. The method of claim 11 wherein the step of generating a motion indicating signal comprises summing the respectively sensed level differences; and generating a level adjusting coefficient signal K as a function of the summed level differences.

14. A method of improving the quality of video signals received as successive scan lines in interlaced fields comprising the steps of separating the received video signals into luminance and chrominance components; digitizing the respective luminance and chrominance components; delaying the luminance component to provide a first scan line luminance signal in a given field, the next succeeding scan line luminance signal in that field, an interlaced scan line luminance signal in the next succeeding field and an interlaced scan line luminance signal in the next preceding field; delaying the chrominance component to provide a first scan line chrominance signal in said given field, the next succeeding scan line chrominance signal in that field, an interlaced scan line chrominance signal in said next succeeding field and an interlaced scan line chrominance signal in said next preceding field; averaging the luminance signal values of the next succeeding field interlaced scan line and the next preceding field interlaced scan line to form a first average luminance signal; averaging the luminance signal values of the first scan line in said given field and the next succeeding scan line in that field to form a second average luminance signal; averaging the chrominance signal values of the next succeeding field interlaced scan line and the next preceding field interlaced scan line to form a first average chrominance signal; averaging the chrominance signal values of the first scan line in said given field and the next succeeding scan line in that field to form a second average chrominance signal; detecting motion in a video picture represented by the received video signals; level adjusting the first and second average luminance signals relative to each other and level adjusting the first and second average chrominance signals relative to each other as a function of said detected motion; averaging the luminance signal values of said first scan line in said given field and that same scan line in an adjacent frame to form an average main scan line luminance signal; level adjusting said average main scan line luminance signal and said first scan line luminance signal in said given field relative to each other as a function of said detected motion; averaging the chrominance signal values of said first scan line in said given field and that same scan line in an adjacent frame to form an average main scan line chrominance signal; level adjusting said average main scan line chrominance signal and said first scan line chrominance signal in said given field relative to each other as a function of said detected motion; adding the level adjusted first and second average luminance signals to produce an interpolated scan line luminance signal intermediate said first scan line and said next succeeding scan line in said given field; adding the level adjusted average main scan line luminance signal and first scan line luminance signal to produce a modified main scan line luminance signal; adding the level adjusted first and second average chrominance signals to produce an interpolated scan line chrominance signal intermediate said first scan line and said next succeeding scan line in said given field; and adding the level adjusted average main scan line chrominance signal and first scan line chrominance signal to produce a modified main scan line chrominance signal.

15. The method of claim 14 further comprising the steps of time-compressing the interpolated scan line luminance and chrominance signals and time-compressing the modified main scan line luminance and chrominance signals such that the period of each is approximately one-half a conventional horizontal scan period.

16. The method of claim 15 further comprising the steps of converting the time-compressed interpolated scan line luminance signal, the time-compressed modified main scan line luminance signal, the time-compressed interpolated scan line chrominance signal and the time-compressed modified main scan line chrominance signal from digital to analog form; and combining the analog signals as a composite video signal with main and interpolated scan lines in each field.

17. Apparatus for generating scan lines of video signals in response to received video signals comprised of conventional scan lines of successive fields, said apparatus comprising: delay means for delaying the received video signals to provide a first scan line signal in a given field, the next succeeding scan line signal in that field, an interlaced scan line signal in the next succeeding field an interlaced scan line signal in the next preceding field, said delay means including first, second and third field memory means connected in cascade and each adapted to store a field of the received video signals, each field memory means having an output for providing a scan line signal of the field stored therein, first combining means for combining the signal values of the next succeeding field interlaced scan line signal and the next preceding field interlaced scan line signal to form a first combined scan line signal; second combining means for combining the signal values of the first scan line signal in said given field and the next succeeding scan line signal in that field to form a second combined scan line signal; level adjusting means for level adjusting each of the first and second combined scan line signals; and adding means for adding the level adjusted first and second combined scan line signals to produce an interpolated scan line signal intermediate succeeding main scan lines in said given field.

18. The apparatus of claim 17 wherein said first field memory means includes an input for providing said interlaced scan line signal in the next succeeding field, a first output for providing said first scan line signal in said given field and a second output for providing said next succeeding scan line in said given field, said second field memory means includes a third output for providing said interlaced scan line signal in the next preceding field, and said third field memory means includes a fourth output for providing a scan line signal corresponding to said first scan line in the next preceding frame.

19. The apparatus of claim 18 wherein said delay means further comprises analog-to-digital converting means for converting the received video signals to digital form and supplying digitized video signals to said field memory means.

20. Apparatus for generating scan lines of video signals in response to received video signals comprised of conventional scan lines of successive fields, said apparatus comprising: delay means for delaying the received video signals to provide a first scan line signal in a given field, the next succeeding scan line signal in that field, an interlaced scan line signal in the next succeeding field and an interlaced scan line signal in the next preceding field; first combining means for combining the signal values of the next succeeding field interlaced scan line signal and the next preceding field interlaced scan line signal to form a first combined scan line signa; second combining means for combining the signal values of the first scan line signal in said given field and the next succeeding scan line signal in that field to form a second combined scan line signa; level adjusting means including motion detecting means for detecting motion in a video picture represented by the received video signal, and variable gain means for adjusting the relative levels of said first and second combined scan line signals as a function of detected motion; adding means for adding the level adjusted first and second combined scan line signals to produce an interpolated scan line signal intermediate succeeding main scan lines in said given field; and main scan line modifying means for modifying a main scan line signal in said given field as a function of detected motion.

21. The apparatus of claim 20 wherein said main scan line modifying means comprises third combining means for combining the signal values of said first scan line in said given field and that same scan line in the next preceding frame to form a combined main scan line signal; second level adjusting means for level adjusting the relative values of said combined main scan line signal and said first scan line signal in said given field as a function of detected motion; and second adding means for adding the level adjusted combined main scan line signal and first scan line signal to produce a modified main scan line signal.

22. The apparatus of claim 21 wherein said third combining means comprises signal value averaging means.

23. The apparatus of claim 21 wherein said second level adjusting means comprises second variable gain means for increasing the combined main scan line signal value relative to the first scan line signal value in response to lesser detected motion in said video picture and for increasing the first scan line signal value relative to the combined main scan line signal value in response to greater detected motion in said video picture.

24. The apparatus of claim 23 wherein said second variable gain means comprises gain control means for generating a gain factor K, wherein K varies from 0 to 1 as detected motion in said video picture varies from still to substantial movement; third amplifying means for amplifying said combined main scan line signal by a factor $(1-K)$; and fourth amplifying means for amplifying said first scan line signal by a factor K.

25. The apparatus of claim 21 further comprising compressing means for time-compressing both said interpolated scan line signal and said modified main scan line signal such that the period of each is approximately one half a conventional horizontal scan line period.

26. The apparatus of claim 21 wherein said video signals are luminance signals.

27. The apparatus of claim 21 wherein said video signals are chrominance signals.

28. The apparatus of claim 21 wherein said video signals are composite video signals including luminance and chrominance components; further comprising separating means for separating the luminance and chrominance components; and wherein said delay means comprises luminance and chrominance delay means for delaying the luminance and chrominance components, respectively; and the combining, level adjusting and adding means comprise luminance and chrominance combining, level adjusting and adding means for producing respective interpolated and modified main scan line signals of the luminance and chrominance components.

29. Apparatus for generating scan lines of video signals in response to received video signals comprised of conventional scan lines of successive fields, said apparatus comprising: delay means for delaying the received video signals to provide a first scan line signal in a given field, the next succeeding scan line signal in that field, an interlaced scan line signal in the next succeeding field and an interlaced scan line signal in the next preceding field; first combining means for combining the signal values of the next succeeding field interlaced scan line signal and the next preceding field interlaced scan line signal to form a first combined scan line signal; second combining means for combining the signal values of the first scan like signal in said given field and the next succeeding scan line signal in that field to form a second combined scan line signal; level adjusting means including motion detecting means comprised of first sensing means for sensing level differences between said interlaced scan line signals in the next succeeding and preceding fields, second sensing means for sensing level differences between said first scan line signal in said given field and the signal of that same scan line in the next preceding frame and motion indicating means for generating a motion indicating signal as a function of the level differences sensed by said first and second sensing means, and variable gain means for adjusting the relative levels of said fist and second combined scan line signals as a function of said motion indicating signal; and adding means for adding the level adjusted first and second combined scan line signals to produce an interpolated scan line signal intermediate succeeding main scan lines in said given field.

30. The apparatus of claim 29 wherein the respective scan line signals whose level differences are sensed are luminance signals.

31. The apparatus of claim 29 wherein said motion indicating means comprises summing means for summing the level differences sensed by said first and second sensing means; and means for generating a gain determining coefficient K as a function of the summed level differences.

32. Apparatus for improving the quality of video signals received as successive scan lines in interlaced fields comprising: separating means for separating the received video signals into luminance and chrominance components; A/D converting means for digitizing the respective luminance and chrominance components; three luminance field memory means connected in cascade and each adapted to store a field of the luminance component, the field memory means having respective outputs to provide a first scan line luminance signal in a given field, the next succeeding scan line luminance signal in that field, an interlaced scan line luminance signal in the next preceding field and a scan line luminance signal corresponding to said first scan line in the next preceding frame; three chrominance field memory means connected in cascade and each adapted to store a field of the chrominance component, the field memory means having respective output to provide a first scan line chrominance signal in said given field, the next succeeding scan line chrominance signal in that field, an interlaced scan line chrominance signal in said next preceding field and a scan line chrominance signal corresponding to said first scan line in said next preceding frame; first averaging means coupled to an input of the luminance field memory means and to a predetermined output thereof for averaging the luminance signal values of the next succeeding field interlaced scan line provided at said input and the next preceding field interlaced scan line to form a first average luminance signal;

second averaging means coupled to predetermined outputs of said luminance field memory means for averaging the luminance signal values of the first scan line in said given field and the next succeeding scan line in that field to form a second average luminance signal; third averaging means coupled to an input of the chrominance field memory means and to a predetermined output thereof for averaging the chrominance signal values of the next succeeding field interlaced scan line provided at said input and the next preceding field interlaced scan line to form a first average chrominance signal; fourth averaging means coupled to predetermined outputs of said chrominance field memory means for averaging the chrominance signal values of the first scan line in said given field and the next succeeding scan line in that field to form a second average chrominance signal; motion detecting means for detecting motion in a video picture represented by the received video signals; first luminance level adjusting means for level adjusting the first and second average luminance signals relative to each other as a function of said detected motion; first chrominance level adjusting means for level adjusting the first and second average chrominance signals relative to each other as a function of said detected motion; fifth averaging means coupled to predetermined outputs of said luminance field memory means for averaging the luminance signal values of said first scan line in said given field and that same scan line in the next preceding frame to form an average main scan line luminance signal; second luminance level adjusting means for level adjusting said average main scan line luminance signal and said first scan line luminance signal in said given field relative to each other as a function of said detected motion; sixth averaging means coupled to predetermined outputs of said chrominance field memory means for averaging the chrominance signal values of said first scan line in said given field and that same scan line in the next preceding frame to form an average main scan line chrominance signal; second chrominance level adjusting means for level adjusting said average main scan line chrominance signal and said first scan line chrominance signal in said given field relative to each other as a function of said detected motion; first luminance adding means for adding the level adjusted first and second average luminance signals to produce an interpolated scan line luminance signal intermediate succeeding main scan lines in said given field; second luminance adding means for adding the level adjusted average main scan line luminance signal and first scan line luminance signal to produce a modified main scan line luminance signal; first chrominance adding means for adding the level adjusted first and second average chrominance signals to produce an interpolated scan line chrominance signal intermediate succeeding main scan lines in said given field; and second chrominance adding means for adding the level adjusted average main scan line chrominance signal and first scan line chrominance signal to produce a modified main scan line chrominance signal.

33. The apparatus of claim 32 further comprising compressing means for time-compressing the interpolated scan line luminance and chrominance signals and the modified main scan line luminance and chrominance signals such that the period of each is approximately one-half a conventional horizontal scan period.

34. The apparatus of claim 33 further comprising D/A means for converting the time-compressed interpolated scan line luminance signal, the time-compressed modified main scan line luminance signal, the time-compressed interpolated scan line chrominance signal and the time-compressed modified main scan line chrominance signal from digital to analog form; and combining means for combining the analog signals as a composite video signal with main and interpolated scan lines in each field.

* * * * *